United States Patent
Boitard et al.

(10) Patent No.: US 11,099,619 B2
(45) Date of Patent: Aug. 24, 2021

(54) POWER SUPPLY MANAGEMENT FOR A DATA STORAGE DEVICE

(71) Applicant: NXP B.V., Eindhoven (NL)

(72) Inventors: Fabien Boitard, Mouans Sartoux (FR); Ludovic Oddoart, Nice (FR)

(73) Assignee: NXP B.V., Eindhoven (NL)

( * ) Notice: Subject to any disclaimer, the term of this patent is extended or adjusted under 35 U.S.C. 154(b) by 222 days.

(21) Appl. No.: 16/517,227

(22) Filed: Jul. 19, 2019

(65) Prior Publication Data

US 2020/0356152 A1 Nov. 12, 2020

(30) Foreign Application Priority Data

May 10, 2019 (EP) ..................................... 19305600

(51) Int. Cl.
*G06F 1/00* (2006.01)
*G06F 1/26* (2006.01)
*H04B 5/00* (2006.01)

(52) U.S. Cl.
CPC ........... *G06F 1/266* (2013.01); *H04B 5/0031* (2013.01)

(58) Field of Classification Search
CPC .............. G06F 1/266; G06F 1/30; G06F 1/28; G06F 1/263; H04B 5/0031; G06K 19/0701; G06K 7/0008; G06K 7/10247; H02J 7/0063
See application file for complete search history.

(56) References Cited

U.S. PATENT DOCUMENTS

| 5,012,121 A * | 4/1991 | Hammond | H02J 9/061 307/64 |
|---|---|---|---|
| 2009/0212908 A1* | 8/2009 | Lin | G06K 19/0723 340/5.81 |
| 2012/0311352 A1* | 12/2012 | Luo | G06F 1/28 713/300 |
| 2014/0008984 A1 | 1/2014 | Kamiyama et al. | |
| 2017/0124938 A1* | 5/2017 | Kim | G09G 3/32 |
| 2017/0147062 A1* | 5/2017 | Yen | G06F 1/263 |
| 2017/0293336 A1* | 10/2017 | Wang | G06F 1/28 |

FOREIGN PATENT DOCUMENTS

EP 2518587 A1 10/2012

\* cited by examiner

*Primary Examiner* — Xuxing Chen

(57) ABSTRACT

A chip includes a first pin coupled to a signal line and a controller to detect a state of the signal line using the first pin. The controller controls output of first power to the signal line through the first pin based on a first state of the signal line and prevents output of the first power to the signal line through the first pin based on a second state of the signal line. The signal line may be coupled to provide second power from a power source to a data storage device.

17 Claims, 4 Drawing Sheets

POWER SUPPLY MANAGEMENT FOR A DATA STORAGE DEVICE

This application is based upon and claims the benefit of priority from prior European Patent Application No. 19305600.9, filed May 10, 2019, which is hereby incorporated by reference for all purposes as if fully set forth herein.

TECHNICAL FIELD

Example embodiments disclosed herein relate to power management in an electronic device.

BACKGROUND

Near-field communications (NFC) chips are used to perform various applications. When incorporated within a smartphone or another host device, an NFC chip may communicate with a universal integrated circuit card (UICC) using a single wire protocol in order to access personal data. Examples of personal data stored in the UICC include wireless subscriber information, account information, identification information, phone numbers, contacts, credit card numbers, and various types of control information. Information accessed from the UICC may be transmitted by the NFC chip to an external device, for example, in order to authenticate a subscriber when making a wireless electronic payment or to support other applications.

Devices which use an NFC chip and a UICC have a number of drawbacks. For example, all power to the UICC is supplied from or through the NFC chip, irrespective of the on or off state of the device. In these or other devices, a multiplexer (or other form of switching circuit) is used to control power to the UICC. These approaches increase the number of pins of the NFC chip and also require a monitoring operation for managing multiplexer switching, even when the NFC is off. These drawbacks increase the cost and complexity of the design and consume significant current.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a chip includes a first pin coupled to a signal line and a controller to detect a state of the signal line using the first pin, wherein the controller is to control output of first power to the signal line through the first pin based on a first state of the signal line and prevent output of the first power to the signal line through the first pin based on a second state of the signal line. The signal line is coupled to provide second power from a power source to a data storage device. The first state may be absence of the second power on the signal line, and the second state may be presence of the second power on the signal line.

The controller may detect the first state when a signal based on the second power is not received from the signal line through the first pin and may detect the second state when a signal based on the second power is received from the signal line through the first pin. The chip may exclude a signal path that passes power from the power source to the data storage device.

The chip may include a second pin to receive third power to power the chip, wherein the controller controls output of the first power to the signal line based on the third power exclusive of the second power. The chip may include a third pin to output/receive data to/from the data storage device based on a single wire protocol. The chip may include a near-field communications circuit to transmit/receive data to/from the data storage device through a wireless path. The data storage device may be a universal integrated circuit card (UICC) and the power source may be a mobile terminal.

In accordance with one or more embodiments, a method for managing power includes detecting a state of a signal line using a first pin of a chip, controlling output of first power to the signal line through the first pin based on a first state of the signal line, and preventing output of the first power to the signal line through the first pin based on a second state of the signal line, wherein the signal line is coupled to provide second power from a power source to a data storage device.

The first state may be an absence of the second power on the signal line, and the second state may be a presence of the second power on the signal line. The method may include detecting the first state when a signal based on the second power is not received from the signal line through the first pin, and detecting the second state when a signal based on the second power is received from the signal line through the first pin. The method may include receiving third power through a second pin of the chip, wherein the third power is to power the chip and wherein output of the first power to the signal line is controlled based on the third power exclusive of the second power. The method may include outputting data to or receive data from the data storage device through a third pin of the chip based on a single wire protocol.

In accordance with one or more embodiments, a non-transitory machine-readable medium storing instructions which cause a processor to detect a state of a signal line using a first pin of a chip, control output of first power to the signal line through the first pin based on a first state of the signal line, and prevent output of the first power to the signal line through the first pin based on a second state of the signal line, wherein the signal line is coupled to provide second power from a power source to a data storage device. The first state may be an absence of the second power on the signal line, and the second state may be a presence of the second power on the signal line.

The instructions may cause the processor to detect the first state when a signal based on the second power is not received from the signal line through the first pin, and detect the second state when a signal based on the second power is received from the signal line through the first pin. The instructions may cause the processor to receive third power through a second pin of the chip, wherein the third power is to power the chip and wherein the instructions control the processor to output the first power to the signal line based on the third power exclusive of the second power. The instructions cause the processor to output data to or receive data from the data storage device through a third pin of the chip based on a single wire protocol. The first and second power may be at different levels.

BRIEF DESCRIPTION OF THE DRAWINGS

Additional objects and features of the invention will be more readily apparent from the following detailed descrip

DETAILED DESCRIPTION

Figure 1:
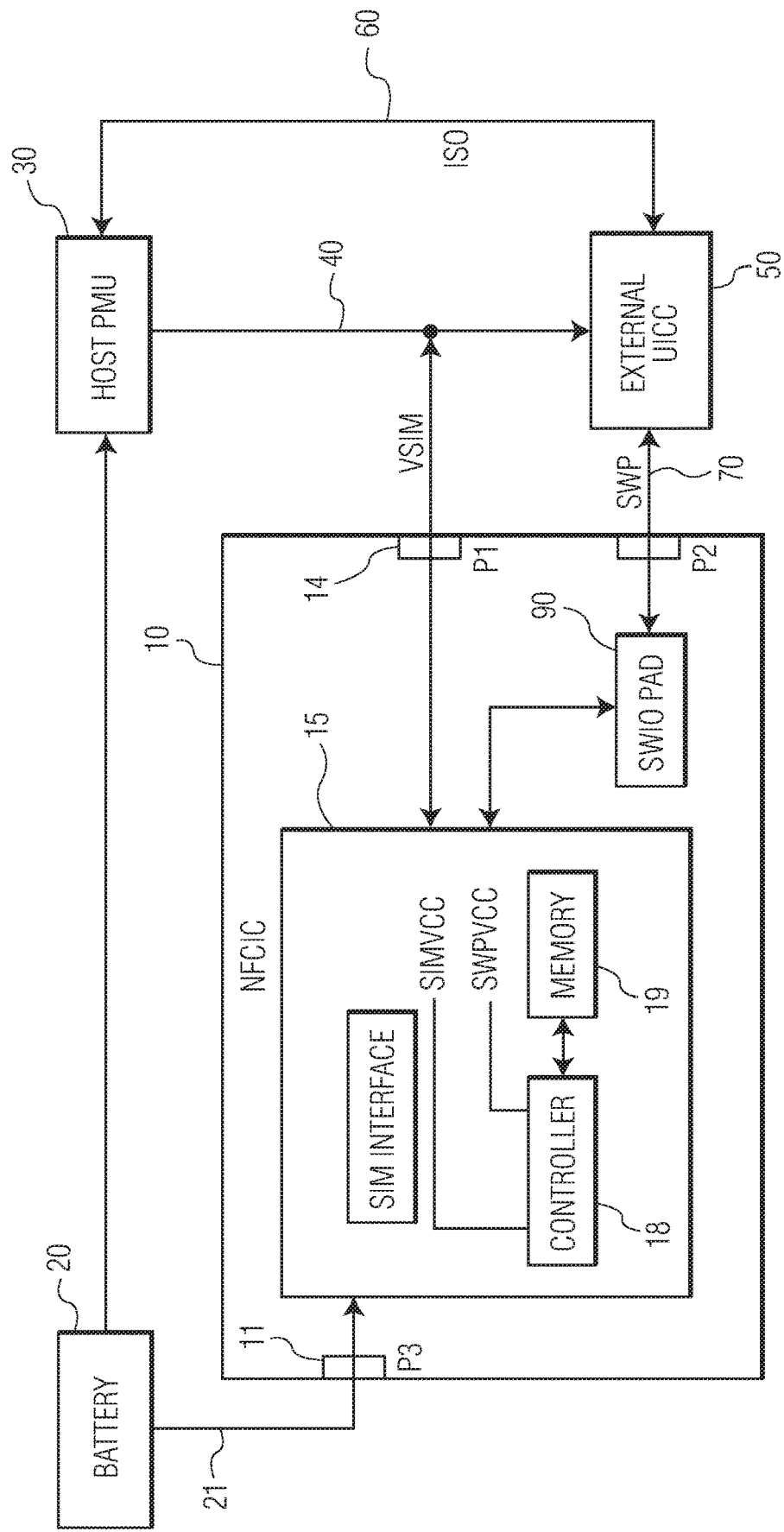
- FIG. 1 illustrates an embodiment of a chip.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates an embodiment of a chip 10 for performing power management in an electronic system. The electronic system may be, for example, a mobile device such as a smartphone, tablet, personal digital assistant, media player, notebook computer, Internet of Things (IoT) device, or another type of information or processing terminal. In one embodiment, the chip 10 may include a near-field communications integrated circuit (NFC IC) for communicating signals between the electronic system and an external device. For example, in one embodiment, the NFC IC may communicate personal data, financial data, identification, and/or other data to an external device through a near-field wireless link. (the antenna of the NFC IC is not illustrated). For illustrative purposes, the electronic system will be referred to as a host system.

In addition to the chip 10, the host system includes at least one power source 20, a power management unit (PMU) 30, and a signal line 40 to be coupled to a data storage device 50. The power source 20 provides power to the chip 10 through a pin 11 and corresponding signal line 21. At least a portion of this power is used to operate an interface 15 of the chip. The power source 20 may be a battery used to power the host system or may be another type of power source, e.g., adapter power. In one embodiment, the host system may include multiple power sources, any one of which may be used to provide power to the chip 10 through pin 11.

In this embodiment, the power source 20 also provides power to the power management unit 30 of the host system. The power management unit 30 may include a voltage regulator to adjust the level of the received power to match an operating specification of the data storage device 50. The power management unit 30 outputs the regulated power to the data storage device 50 through signal line 40, for example, in order to support data write and read operations. The power management unit 30 may also bidirectionally communicate with the data storage device 50 through another signal line 60, which carries signals independently from the signal line 40. The signal line 60 may perform communications based on a predetermined protocol, e.g., a predetermined type of ISO protocol.

A controller in the power management unit 30 may determine when signals are to be communicated through signal line 40 and signal line 60, for example, based on stored instructions. For example, the power management unit may output regulated power to the data storage device 50 through signal line 40 when the host system is powered on, and may communicate with the data storage device 50 as determined by the stored instructions.

The data storage device 50 may be any type of removable or fixed storage device in the host system. In one embodiment, the data storage device 50 may be a removable subscriber identity module (SIM) card and the host system may be a smartphone. In one particular embodiment, the data storage device 50 may be a removable universal integrated circuit card (UICC). For illustrative purposes, the data storage device is labeled as an external UICC 50 and the interface 15 is labeled a SIM interface.

The interface 15 of the chip includes a controller 18 and a memory 19. The memory 19 stores instructions (e.g., firmware) executed by the controller 18 to perform one or more operations relative to the UICC 50. These operations include transmitting data to and/or receiving data from the UICC 50 through a pin 12, e.g., Pin 2 (or P2). This pin may be coupled to a signal line 70, which, for example, may be a single wire protocol (SWP) line. The pin P2 may be coupled to the interface 15, for example, through a single wire input/output pad 90. The data carried on the signal line 70 may be any type of data, including but not limited to the examples previously discussed.

In accordance with one or more embodiments, the interface 15 also performs a power control operation relative to the UICC 50. This is accomplished by performing a detection operation and a power operation using the same single pin 14. Using one pin for these purposes reduces the pin count of the chip 10, consumes less space, reduces power consumption, and provides for a simpler design compared to other chips (including NFC chips) which have been proposed.

More specifically, in one embodiment, the interface 15 of the chip includes a pin (Pin 1, or P1) coupled to the signal line 40, which directly supplies power to the UICC 50 under various conditions. Such a direct supply of power includes the case where power from the power management unit is supplied to the UICC through signal line 40 along a path that does not pass through the chip 10. In other proposed chips, power to the UICC is, first, supplied to the chip and, then, is supplied from the chip to the UICC. In these other chips, the power is received from a power source through one pin, and the chip supplies power to the UICC through a different pin. Such an arrangement consumes significant power and increases the necessary pin count. In contrast, by using only one pin as both an input pin and an output in, the chip 10 is able to achieve improved performance.

The controller 18 controls the operations involving pin 14 (Pin 1) based on the instructions stored in the memory 19. In one embodiment, the controller 18 performs a monitoring operation to detect the state of the signal line 40. The monitoring operation may include detecting the level of voltage on the signal line 40 through pin 14. The absence of a voltage on the signal line 40 (first state) may indicate that no power is being supplied from the power management unit 30 to the UICC through signal line 40. This may occur, for example, when the host system is powered off or in a low power state. When the signal line 40 is detected to be in the first state based on a signal received through pin 14, the controller 18 may output power to the signal line 40 through the same pin 14. This power then propagates along the remaining portion of the signal line 40 to power the UICC. The controller 18 may output power to the UICC in the first state, for example, based on the power received from power source 20 through pin 11 (e.g., Pin 3, or P3). In one embodiment, this power may be provided exclusive of the power output from the power management unit 30.

When the controller 18 detects the presence of a voltage on the signal line 40 (second state), this may indicate that power is being supplied from the power management unit 30 to the UICC through on the signal line 40. When this occurs, the controller 18 may supply power to the UICC through pin 14 and signal line 40 in parallel with the power supplied from the power management unit 30 to the UICC. In another embodiment, the controller 18 may switch off or prevent the output of power to the UICC through pin 14 and signal line 40, because the UICC is already being directly powered by the power management unit 30 through signal line 40 in this state. In this latter case, a detector may detect the output of power from the power management unit 30 to the UICC and send a signal to the controller 18 indicating the same.

In one embodiment, instead of just detecting the presence or absence of a voltage on signal line 40, the controller 18 may detect a certain level of a voltage or current on the signal line 40 as a pre-condition to performing a power operation for the UICC. Detecting a certain level (or range) of voltage or current on signal line 40 may provide a more accurate indication of when the power operation is to be performed by the interface 15 of the chip, e.g., by discounting spurious signals produced by noise, coupling, and/or other effects.

In accordance with one or more embodiments, by using only one input/output pin 14 (P1) to receive (and detect) power supplied from the host system (e.g., through power management unit 3) to the UICC and to provide power to the UICC when signal line 40 is in different states, significant power savings may be achieved. For example, the amount of current (e.g., 60 mA) provided by an NFC chip in other designs when the smartphone is on is not provided by the NFC IC chip 10. Rather, this current is provided directly to the UICC by the host system (e.g., power management unit 30) through signal line 40. As a result, the size of the chip 10 may be reduced relative to other (e.g., NFC) chips, e.g., through a reduction in the number of chip pins. For example, a 40 nm UICC supply management feature size may be reduced from 0.29 mm$^2$ to 0.14 mm$^2$, which amounts to about 0.15 mm$^2$ less space compared to other designs. Considering that NFC chip sales are about 250 million units annually, that represents about $1.5M costs savings.

Also, when the smartphone is off (or in a low power mode), the controller 18 may provide power (e.g., 10 mA current) to the UICC 50 exclusively, for example, in order to support SWP communications between the chip and UICC 50 through signal line 70 (via pin P2). Through these embodiments, monitoring operations that are performed in other proposed designs (which consume significant power) may not be performed, leading to significant reduction in current consumption.

Additionally, because the power from the host system (PMU 30) and the power from the chip 10 are provided in parallel to supply the UICC, the controller 18 of the chip can still communicate with the UICC and the host can still communicate with the UICC via the ISO signal line 60 independently from one another, and even under conditions where the host system and the chip are both operating. Moreover, the power control features of the chip 10 may be performed in a manner transparent to both the host system and the UICC. Also, the size reduction achievable by the chip 10 (as previously discussed) may reduce the interconnection features of the chip to a host printed circuit board (e.g., may require fewer solder balls) compared with other designs. Also, because one or more embodiments may be firmware-driven, any change to be implemented by the chip in performing power control and/or SWP communications with the IC may be implemented simply by changing the firmware stored in the memory 19 (e.g., does not require replacing the existing chip with a new chip).

Figure 2:
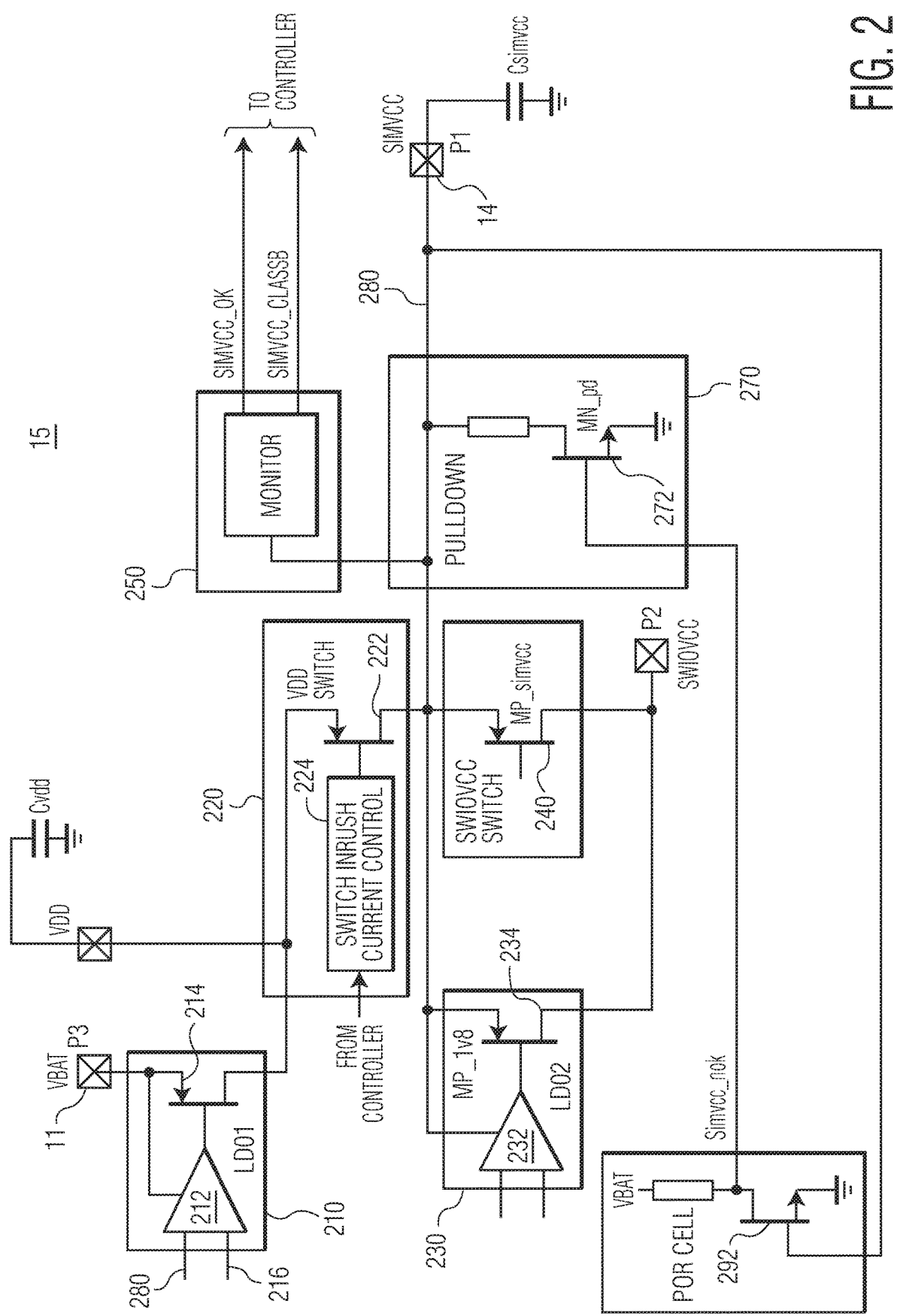
FIG. 2 illustrates an embodiment of a circuit included in the chip.

FIG. 2 illustrates a circuit embodiment of interface 15 which includes a first voltage regulator 210, a current controller 220, a second voltage regulator 230, a switch 240, and a monitor 250. In this embodiment, the voltage regulators may be low dropout (LDO) voltage regulators, and pin 11 (P3) may correspond to the VBAT pin, pin 12 (P2) may correspond to the supply voltage SWIOVCC, and pin 14 (P1) may correspond to the SIMVCC pin.

Referring to FIG. 2, when the host system is supplying power to the UICC 50, the monitor 250 detects a voltage above a predetermined value flowing along the signal line 280 coupled to the SIMVCC pin (P1). In one embodiment, the host system may output a voltage that conforms to a predetermined standard. For a SIM standard, the voltage may be 3V.

When the voltage is detected above the predetermined value on the signal line 280 coupled to the SIMVCC pin (e.g., when the host device is in the on state or a normal power mode), monitor 250 outputs two signals SIMVCC_OK and SIMVCC_CLASSB to the controller 18 within the interface 15. In this case, the first signal SIMVCC_OK has a first value indicating the presence of a voltage on signal line 40 (which is coupled to the pin receiving the SIMVCC supply). The second signal SIMVCC_CLASSB indicates the level of the detected voltage. The detected voltage may have one of two levels: a first level (e.g., 3V) indicating that the host system (e.g., PMU 30) is supplying power to the UICC or a second level (e.g., 1.8V) indicating that the interface is providing power to the UICC. (In one embodiment, the controller 18 may include the circuits illustrated in FIG. 2. In another embodiment, the controller 18 may be coupled to the circuits illustrated in FIG. 2, e.g., coupled to the monitor 250.)

When the SIMVCC_OK signal value indicates that a voltage has been detected and the SIMVCC_CLASSB signal value indicates that the detected voltage is the first level (e.g., 3V), the controller (or firmware) generates a signal to prevent the first voltage regulator 210 from supplying power to the UICC (through the SIMVCC pin). At this time, a pulldown circuit 270 is disabled. The pulldown circuit is disabled based on the input of power from the host system traveling along signal line 40. For example, the power received through the SIMVCC pin is input into the gate of a NMOS transistor 292, which creates a path to ground. This generates a SIMVCC_NOK signal having a logical 0 value, which turns off the NMOS transistor 272 and disables the pulldown circuit 270.

When the voltage is detected to be below the predetermined value on the signal line 280 coupled to the SIMVCC pin (e.g., when the host device is in the off state or a low-power power mode), the monitor 250 outputs signal SIMVCC_OK with a second value indicating that the host system is not providing power to the UICC along signal line 40. In this case, the controller (through firmware) couples the power output from the first voltage regulator 210 to the SIMVCC pin, in order to power the UICC through signal line 40. The predetermined value may be, for example, between 1.8V and 3.0V in order to allow the monitor (or firmware) to distinguish between the case where the host system is powering the UICC and the case where the interface 15 is powering the UICC.

The first voltage regulator 210 may output a voltage at the second level (1.8V) based on battery power received through the VBAT (P3) pin. The first voltage regulator may include an amplifier 212 which regulates the battery voltage to generate an output current through PMOS transistor 214. The battery voltage may be regulated by the amplifier 212 based on a first input 216 coupled to a reference voltage and a second input 280 coupled to a feedback loop coupled to the output of the amplifier. The feedback loop may operate to keep the regulated voltage at a stable level (e.g., 1.8V). The size of the amplifier may be sufficient to provide 10 mA of current for powering the UICC when, for example, the host system is in a low-power mode. The power provided by the first voltage regulator 210 to the UICC (through the SIMVCC pin) at this time is sufficient to support various operations, including but not limited to the transfer for data through the MVP line 70.

In order to couple the power regulated by the amplifier to the signal line 280, the controller (under control of firmware) may generate a signal to turn on the VDD switch 222. Turning on the VDD switch 222 at this time would disrupt the specific level of power (e.g., 1.8V) provided from the first voltage regulator 210. To compensate (e.g., reduce or eliminate) any change to the output of the first voltage regulator 210 as a result of turning on VDD switch 222, the controller may generate a control signal to enable the switch in-rush current controller 224. In one embodiment, the in-rush current controller 224 may progressively turn on the VDD switch 222, to offset any disruption in the voltage level output from the first voltage regulator 210, and to thereby allow coupling of power from the first voltage regulator 210 to signal line 280 and thus to the SIMVCC pin 14.

In one embodiment, a switch may be coupled between the VDD pin and the current controller 220 to disconnect the VDD pin from the current controller 220 under these conditions. Also, in one embodiment, the output signal of the first voltage regulator 210 may be coupled to the signal line 280 along a signal path that does not pass through the current controller 220.

Prior to switching power from the first voltage regulator 210 to signal line 280, the low (or zero) voltage on the signal line 280 turns off transistor 292. As a result, the SIMVCC_NOK signal will have a logically high value based on the VBAT voltage. The logically high value of the SIMVCC_NOK signal will turn on transistor 272, which causes the pulldown circuit 270 to pulldown (or ground) signal line 280. Thus, the pulldown circuit may remove any residual or spurious signals that may offset the level of power (e.g., 1.8V) from the first voltage regulator 210 to be supplied to the UICC.

When the monitor 250 detects that the voltage level of the SIMVCC pin 14 is below a predetermined value (indicating that the HOST is now powering the UICC), then the SIMVCC_OK signal is high and SIMVCC_CLASSB may have a value indicating the class of the UICC. The controller may control the supply SWIO pad accordingly, knowing that the SWIO pad is to be supplied by 1.8V only. In one embodiment, if SIMVCC=1.8V, then transistor 240 may be switched to supply SWIOVCC. If SIMVCC=3V, then transistor 234 may be switched to supply SWIOVCC. In one embodiment, when SIMVCC=1.8V, then SIMVCC_OK=1 and CLASSB=0. When SIMVCC=3V, then SIMVCC_OK=1 and CLASSB=1. In these cases, either the second voltage regulator 230 or transistor 240 may be used to supply SWIOVCC to guarantee 1.8V.

The second voltage regulator 230 may be used to provide power to control the output of data (or other signals) to the UICC 50 when the UICC is receiving power from the host system, e.g., at 3V. The SWP (or SWIO) line 70 should be powered at a predetermined level in order to support the transfer of data. According to one standard (e.g., ETSI specification), the SWP line should be powered at 1.8V, but this line may be powered by a different voltage level in another embodiment. The power may be delivered to the SWP line through the SWIOVCC pin (P2).

When the monitor 250 detects that the host system is providing power to the UICC (e.g., at 3V), the controller (through firmware) may generate a control signal to turn off the SWIOVCC switch 240. This effectively disconnects SIMVCC from the SWIOVCC pin under these conditions. An amplifier 232 of the second voltage regulator 230 may then adjust the power received through the SIMVCC pin (e.g., the power supplied by the host system to the UICC) to correspond to the predetermined level. The amplifier 232 may have one input coupled to ground and another input coupled to a feedback loop provide a stable current through transistor 234.

Once the power has been adjusted to the predetermined level, the power is output through the SWIOVCC pin to support communication of data through the SWP line 70. (The circuit that actually transmits the data from the NFC circuit or receives the data from the UICC (e.g., a transceiver) is not shown, but operates based on the power supplied through the SWIOVCC pin).

When the monitor 250 detects that the host system is not providing power to the UICC through signal line 40 and data is to be transmitted along signal line 70 at this time, the current controller circuit 220 controls power to the SIMVCC pin. For example, when the host system is not powering the UICC, the voltage at the SIMVCC pin is 0V or too low to be adjusted by the second voltage regulator. Thus, the controller (through firmware) activates the current controller 224 to turn on the VDD switch 222. In one embodiment, the current controller 224 may be an in-rush current controller to prevent a drop in VDD. Turning on the VDD switch 222 couples power from the VDD pin to the SIMVCC pin at a level sufficient to provide power (e.g., provide 10 mA to) for UICC usage. The controller (through firmware) may generate a control signal to turn on transistor 240 at this time to connect SIMVCC (which is from VDD) to the SWIOVCC pin to perform SWP communications.

When the SIMVCC pin is provided with power by the interface (e.g., battery power supplied to the NFC circuit) and the host system turns on during this time, the NFC circuit may finish communicating over the SWP line 70 at this time and then the interface 15 will stop supplying power to the SIMVCC pin to allow the host system to power the UICC.

Figure 3:
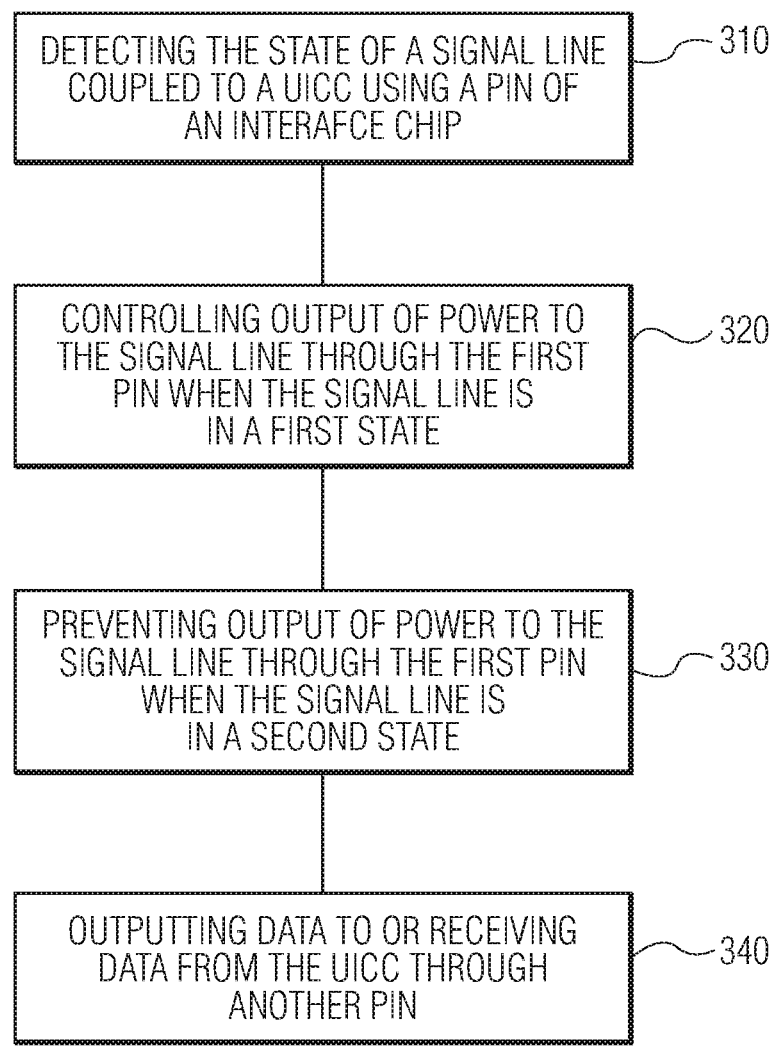
FIG. 3 illustrates an embodiment of a method for managing power.

FIG. 3 illustrates an embodiment of a method for managing power for a data storage device in or coupled to an electronic system. The method may be performed, for example, by one or more embodiments of the chip and/or its interface as illustrated in FIG. 1 within the same host system, or by a different chip and/or host system.

Referring to FIG. 3, the method includes, at 310, detecting a state of a signal line using a first pin of a chip. The signal line may be signal line 40 and the first pin may be pin P1 of chip 10. At 320, the method includes controlling output of first power to the signal line through the first pin based on a first state of the signal line. The first power may be based on the power received through pin P3 (e.g., battery power), and the first state of the signal line 40 may correspond to when no voltage is detected by the controller 18 of the interface 15 through the first pin, or when a predetermined voltage level or range is not detected on signal line 40. At 330, the method includes preventing output of the first power to the signal line 40 through the first pin P1 based on a second state of the signal line. The second state of the signal line is when a voltage (or predetermined voltage level or range) is detected on signal line 40. The detection of such a voltage indicates that the power management unit 30 of the host system is powering the UICC. At 340, the method may include outputting data to or receiving data from the UICC through a third pin 12 (P2) of the chip through an MVP line. This data may be received from or output to the UICC, for example, in connection with near-field communications performed by the NFC chip 10.

In accordance with another embodiment, a non-transitory machine-readable medium stores instructions which cause a processor perform the operations of the chip and method embodiments described herein. For example, the instructions stored in the computer-readable medium may cause the processor to detect a state of a signal line 40 using a first pin P1 of a chip, control output of first power to the signal line 40 through the first pin P1 based on a first state of the signal line 40, and prevent output of the first power to the signal line 40 through the first pin P1 based on a second state of the signal line 40, where the signal line is coupled to provide second power from a power source (e.g., power management unit 30) and a data storage device (e.g., UICC 50). The processor may, for example, correspond to the controller 18 and the computer-readable medium may correspond, for example, to memory 19.

Figure 4:
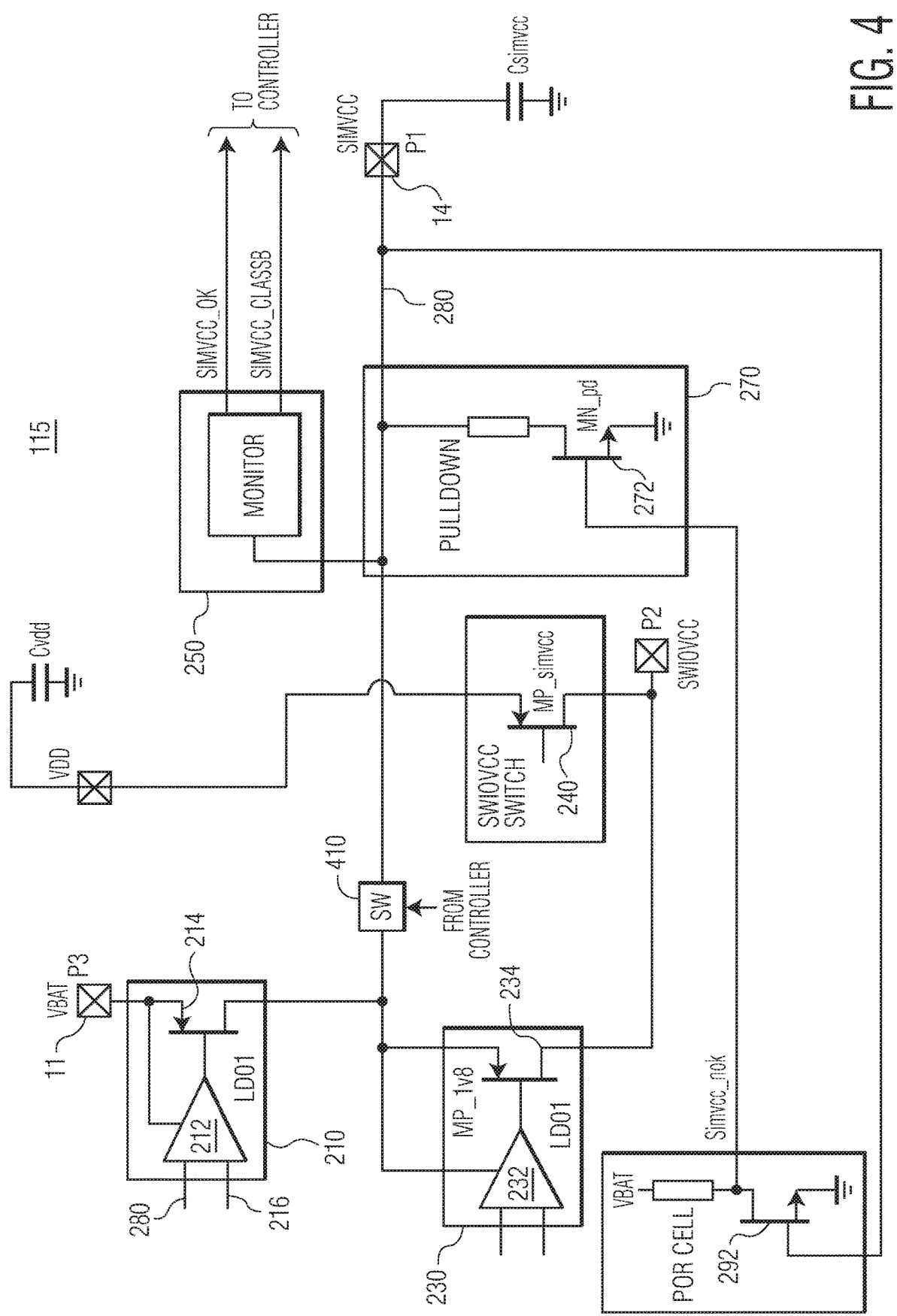
FIG. 4 illustrates another embodiment of a circuit included in the chip.

FIG. 4 illustrates another embodiment of an interface 115 which may be included in chip 10. The interface 115 may have the same features as interface 15 in FIG. 2, except that current controller 220 is omitted and a switch 410 is added. More specifically, in this embodiment, the VDD pin is coupled to transistor 240 without passing through the current controller 220. Thus, power from the VDD pin is routed to the SWIOVCC pin (P2) based on switching of transistor 240, and not based on switching of transistor 240 and the VDD switch 222 (which is omitted in this embodiment) as illustrated in FIG. 2. Also, power from the VBAT (P3) pin 11 is coupled to the signal line 280 without passing through the current controller 220. The switch 410 is included along signal line 280 to pass power from the VBAT pin (P3) to the SIMVCC pin 14. The switch (e.g., a MOSFET) may be switched based on a control signal from the controller.

In another embodiment, FIG. 4 may be modified so that the VDD pin is connected to the output of transistor 214. In this case, switch 410 may not be used if LDO1 210 is dedicated to supply power to the UICC.

The controllers, detectors, units, and other signal-generating and signal-processing features of the embodiments disclosed herein may be implemented in logic which, for example, may include hardware, software, or both. When implemented at least partially in hardware, the controllers, detectors, units, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, detectors, units, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A chip, comprising:
   a first pin coupled to a signal line;
   a second pin configured to receive third power to power the chip, a third pin to output data to or receive data from a data storage device based on a single wire protocol; and
   a controller configured to detect a state of the signal line using the first pin, wherein the controller is configured to control output of first power to the signal line through the first pin based on a first state of the signal line and prevent output of the first power to the signal line through the first pin based on a second state of the signal line, and wherein the signal line is coupled to provide second power from a power source to the data storage device.

2. The chip of claim 1, wherein the first state is an absence of the second power on the signal line, and the second state is a presence of the second power on the signal line.

3. The chip of claim 2, wherein the controller is further configured to detect the first state when a signal based on the second power is not received from the signal line through the first pin and the second state when the signal based on the second power is received from the signal line through the first pin.

4. The chip of claim 1, wherein the chip excludes a signal path that passes power from the power source to the data storage device.

5. The chip of claim 1, wherein the controller is further configured to control output of the first power to the signal line based on the third power exclusive of the second power.

6. The chip of claim 1, further comprising:
a near-field communications circuit configured to transmit data to or to receive data from the data storage device through a wireless communications path.

7. The chip of claim 1, wherein the first power is at a first level, and the second power is at a second level different from the first level.

8. The chip of claim 1, wherein the data storage device is a universal integrated circuit card.

9. The chip of claim 1, wherein the power source is in a mobile terminal.

10. A method for managing power, comprising:
detecting a state of a signal line using a first pin of a chip;
receiving third power through a second pin of the chip to power the chip; outputting data to or receive data from the data storage device through a third pin of the chip based on a single wire protocol;
controlling output of first power to the signal line through the first pin based on a first state of the signal line; and
preventing output of the first power to the signal line through the first pin based on a second state of the signal line, wherein the signal line is coupled to provide second power from a power source to a data storage device.

11. The method of claim 10, wherein the first state is an absence of the second power on the signal line, and the second state is a presence of the second power on the signal line.

12. The method of claim 11, further comprising:
detecting the first state when a signal based on the second power is not received from the signal line through the first pin; and
detecting the second state when the signal based on the second power is received from the signal line through the first pin.

13. The method of claim 10, wherein output of the first power to the signal line is controlled based on the third power exclusive of the second power.

14. A non-transitory machine-readable medium storing instructions which cause a processor to perform a method for managing power, the non-transitory machine-readable medium comprising:
instructions for detecting a state of a signal line using a first pin of a chip;
instructions for receiving third power through a second pin of the chip to power the chip;
instructions for outputting data to or receive data from the data storage device through a third pin of the chip based on a single wire protocol;
instructions for controlling output of first power to the signal line through the first pin based on a first state of the signal line; and
instructions for preventing output of the first power to the signal line through the first pin based on a second state of the signal line, wherein the signal line is coupled to provide second power from a power source to a data storage device.

15. The non-transitory machine-readable medium of claim 14, wherein the first state is an absence of the second power on the signal line, and the second state is a presence of the second power on the signal line.

16. The non-transitory machine-readable medium of claim 15, further comprising:
instructions for detecting the first state when a signal based on the second power is not received from the signal line through the first pin; and
instructions for detecting the second state when the signal based on the second power is received from the signal line through the first pin.

17. The non-transitory machine-readable medium of claim 14, further comprising:
instructions for controlling the processor to output the first power to the signal line based on the third power exclusive of the second power.

* * * * *